Jan. 19, 1932.   F. W. EDWARDS ET AL   1,842,257
MECHANICAL HYDROSTATIC LUBRICATOR
Filed May 28, 1928   4 Sheets-Sheet 1
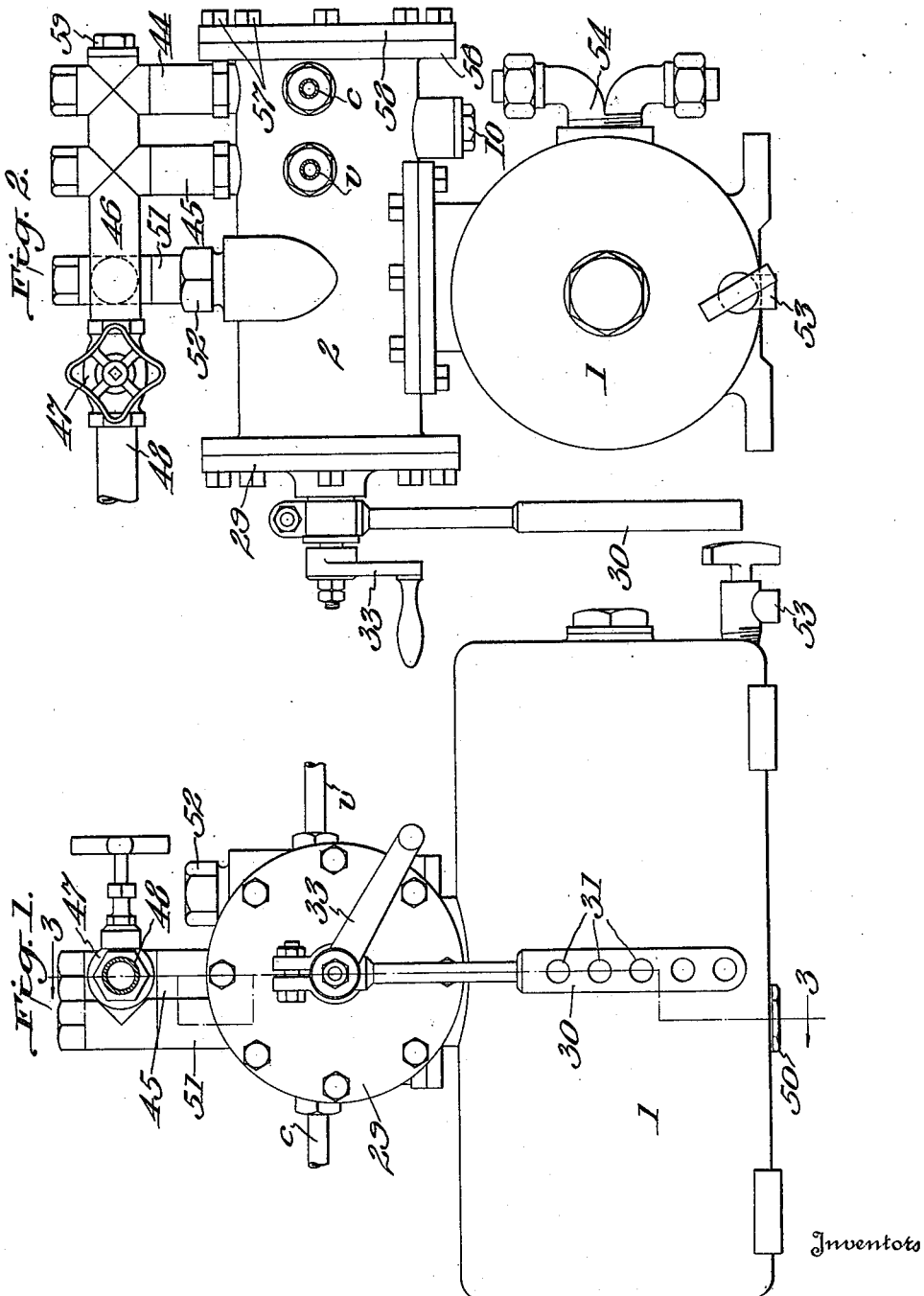

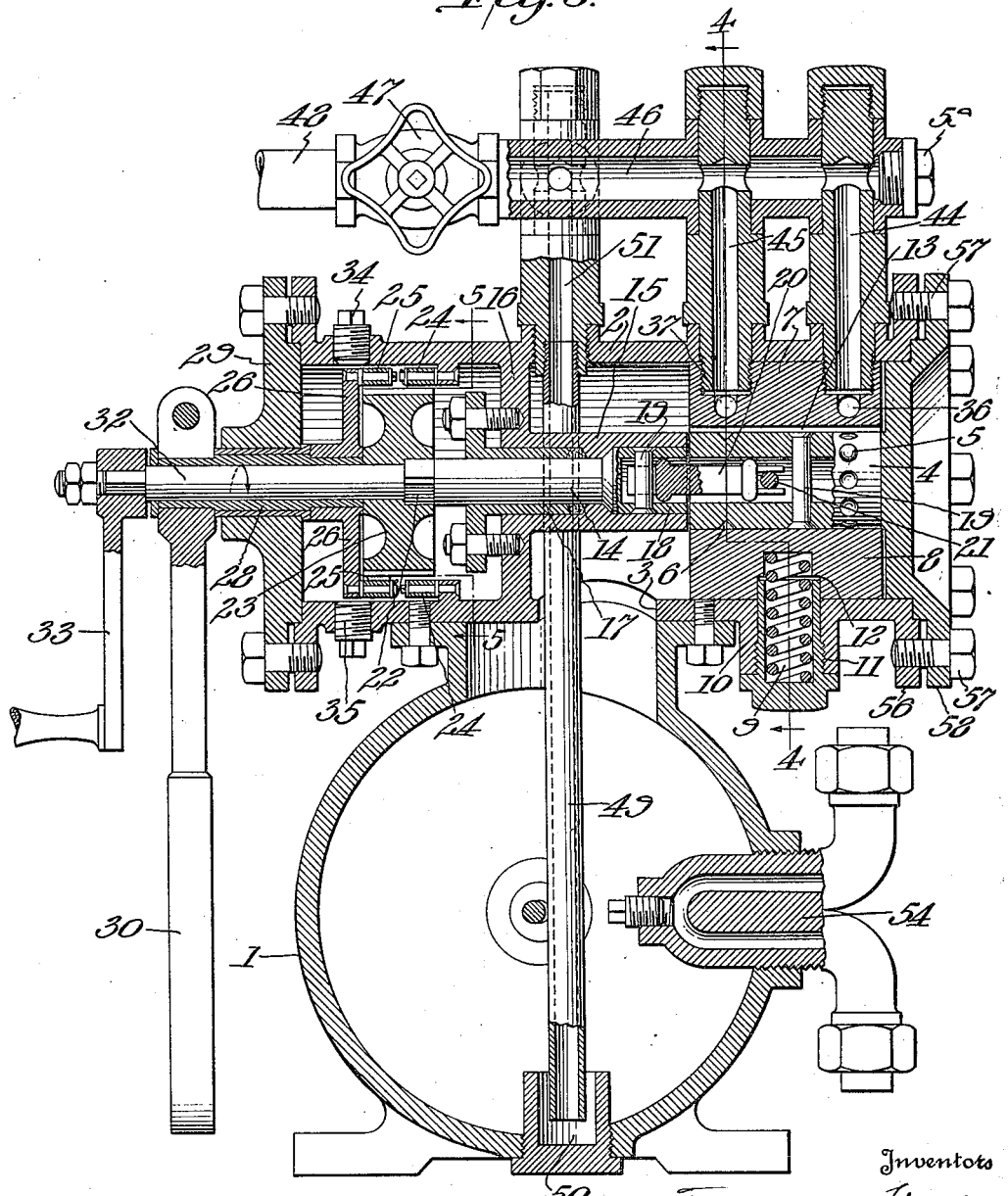

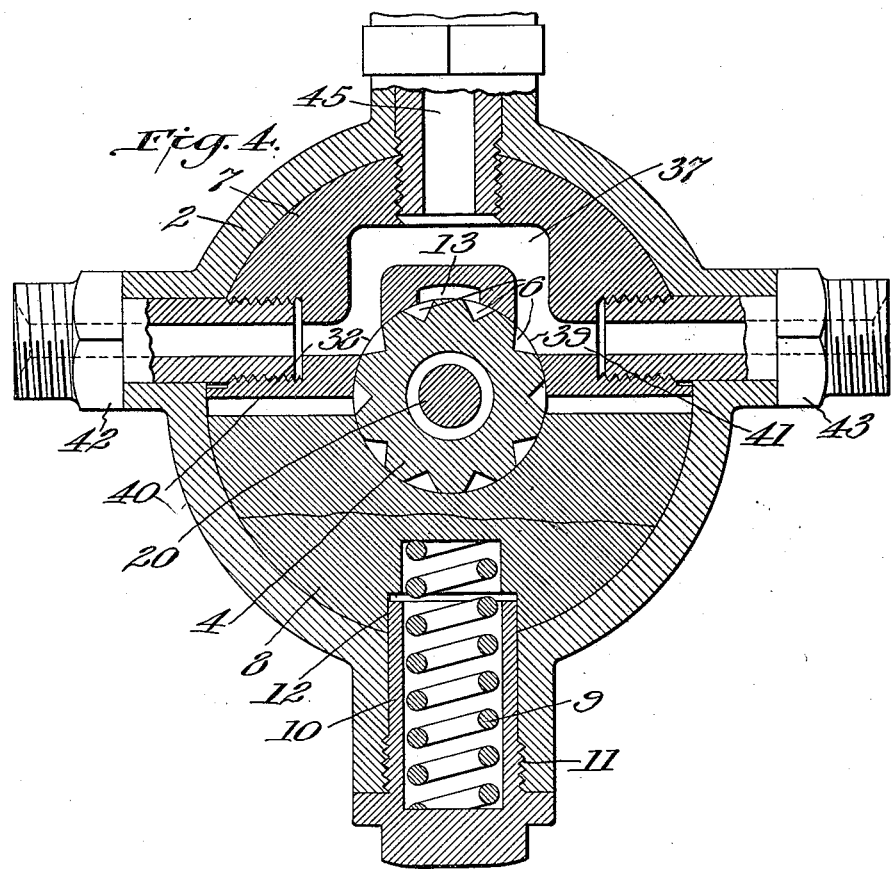
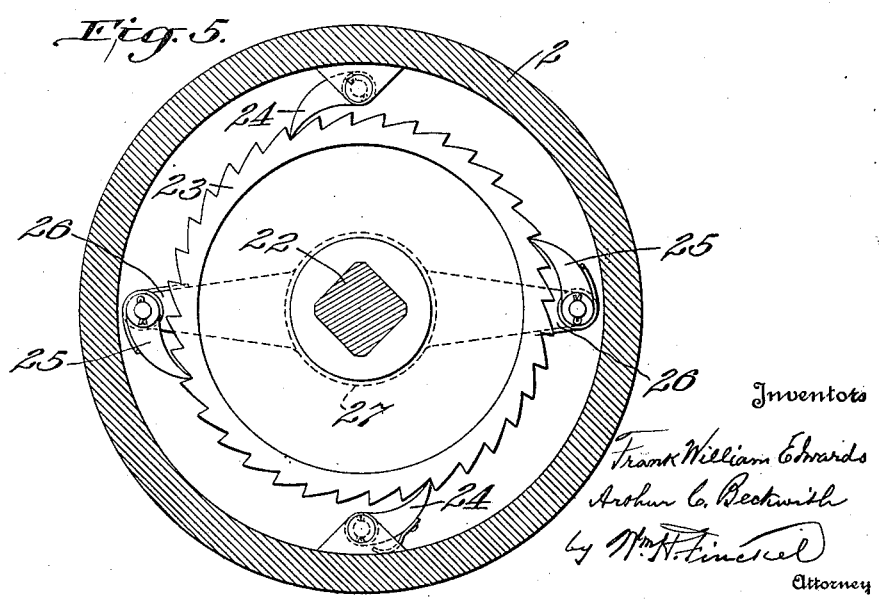

Jan. 19, 1932.  F. W. EDWARDS ET AL  1,842,257
MECHANICAL HYDROSTATIC LUBRICATOR
Filed May 28, 1928  4 Sheets-Sheet 4
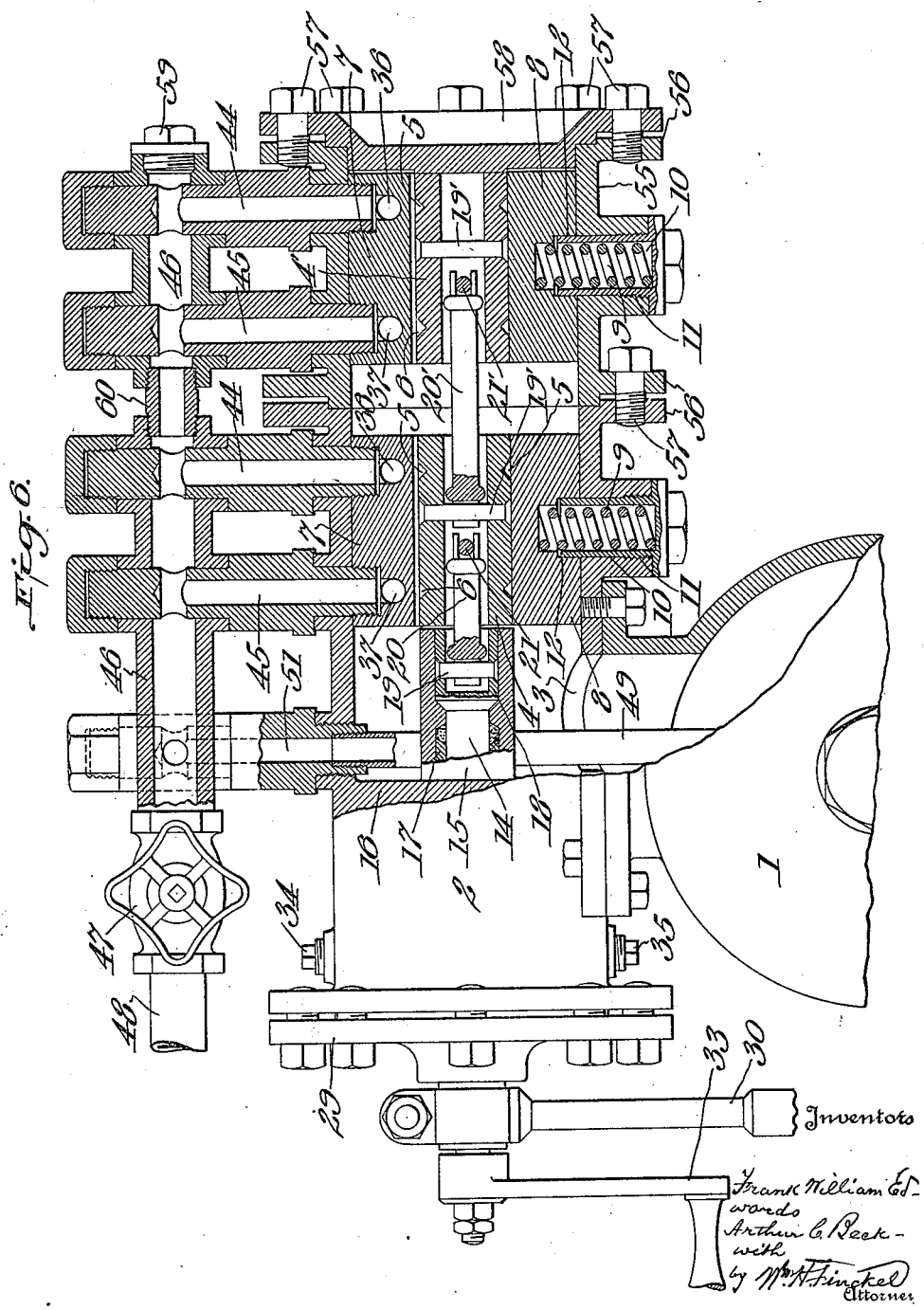

Patented Jan. 19, 1932

1,842,257

UNITED STATES PATENT OFFICE

FRANK WILLIAM EDWARDS AND ARTHUR C. BECKWITH, OF CHICAGO, ILLINOIS, ASSIGNORS TO CHICAGO LUBRICATOR COMPANY, OF CHICAGO, ILLINOIS, A CORPORATION OF ILLINOIS

MECHANICAL HYDROSTATIC LUBRICATOR

Application filed May 28, 1928. Serial No. 281,238.

This invention relates to lubricators, and particularly to a lubricator which embodies both mechanical and hydrostatic principles.

One object of the invention is to provide a mechanical lubricant feeding mechanism to which lubricant may be supplied under pressure and which will hold such pressure and maintain a uniform feed of lubricant while the device is in operation.

Another object is to combine with a mechanical lubricant feeding device, such as that mentioned, means for supplying lubricant to the feeding device by the hydrostatic principle.

A further object is to convey the lubricant fed, by the means referred to, to the point or points of delivery or application by means of a fluid under pressure, such as steam, which picks up the lubricant at the feeding device and conveys it to the point of delivery.

Although in our lubricator we make use of the hydrostatic principle for supplying lubricant to the feeding device, we do not require a balance of pressures in order to obtain a proper feed, as is necessary in ordinary hydrostatic lubricators. All that is required is that there be a sufficient pressure to force the lubricant to the feeding device, and a quantity of water adequate to raise the lubricant into the zone of action of the device.

The invention consists broadly in the combination with mechanical lubricant feeding means, of means whereby the lubricant to be fed may be brought into the zone of action of the feeding means, to the end that, while the lubricator is in a sense a hydrostatic lubricator, it may embody the desirable features of a mechanical lubricator. And the invention consists, further, in various features of construction and operation, as we will proceed now to explain and finally claim.

In the accompanying drawings illustrating the invention, in the several figures of which like parts are similarly designated, Figure 1 is an end elevation of a complete lubricator embodying our invention, and Fig. 2 is a side elevation thereof. Fig. 3 is a central sectional elevation taken on the line 3—3 of Fig. 1, but upon a larger scale. Figs. 4 and 5 are still further enlarged sections taken on the lines 4—4 and 5—5, respectively, of Fig. 3. Fig. 6 is a sectional elevation, similar to Fig. 3, but showing the adaptability of the apparatus of our invention to multiple unit assembly, whereby the number of feeds from a single reservoir may be increased.

In the embodiment of our invention illustrated in the drawings, the apparatus comprises a lubricant reservoir 1 upon which is detachably mounted a housing 2 which contains the mechanism of the mechanical feeding device. The housing 2 is in communication with the reservoir 1 through an opening 3 (Figs. 3 and 6).

The mechanical feed device proper consists of a cylindrical rotary feed valve member 4 provided upon its periphery with aligned sets of recesses or depressions 5 and 6 of such size and number in each set as to give the feed of lubricant required, as will later appear. This valve member is mounted for rotation between an upper bearing block 7 and a lower bearing block 8. The upper bearing block 7 is provided with openings and passages so disposed in relation to each other and to the sets of depressions 5 and 6 as to accomplish the desired distribution of the lubricant, as will be described hereinafter in more detail. The lower bearing block 8 is forced against the valve member 4 by means of a spring 9 mounted in a threaded sleeve 10 screwed into the housing at 11. The end of the sleeve 10 fits into a complemental recess 12 in the block 8. By this arrangement it will be seen that the spring 9 acting upon the block 8 forces this block against the valve member 4 and in turn forces this member 4 to a seat against the bearing block 7. The block 7 being provided with a crown relief 13, any wear of either of the bearing blocks, or of the valve member 4, will be compensated for by the action of the spring 9. Moreover, the spring 9 will be of such strength as to insure at all times a sealed bearing between the block 7 and the valve member 4. The engagement of the sleeve 10 with recess 12 in block 8 prevents lateral movement of said block and guides it in any movement axially of the sleeve which may be imparted to it by the spring 9.

A step by step or intermittent progressive rotary motion is imparted to the valve member 4 by means of a shaft 14 journalled in a bearing sleeve 15 which preferably forms a part of the housing and is supported axially thereof by a septum or web 16. This bearing is provided with a suitable gland 17. The end 18 of the shaft 14 adjacent to the valve member 4 is cupped and provided with a pin 19 which receives one forked end of a driving link 20 having its other forked end in driving engagement with a pin 21 carried by valve member 4. Thus rotation of the shaft 14 will impart a similar movement to the valve member 4.

The shaft 14 is provided with a squared portion 22 which engages a complemental recess in the hub of a rachet wheel 23. The teeth of this ratchet wheel are engaged by drag pawls 24 carried by the housing 2 and by drive pawls 25 carried by the arms 26 of a carrier member 27 (see Fig. 5) mounted upon and rotatable with a sleeve 28 having a bearing in the end cap 29 of the housing 2. A step by step or intermittent rotary movement is imparted to the sleeve 28 by means of a lever arm 30 which may be so coupled to a reciprocating or other moving part of a machine (such as the valve rod or cross-head of a locomotive engine) as to have imparted to it an oscillatory movement. This arm 30 is provided with a plurality of points of attachment 31, Fig. 1, for connection with it of a suitable link or arm so that the effective length of its stroke may be varied.

The shaft 14 is provided with an extension 32 passing through the hub of the ratchet wheel 23 and sleeve 28 and provided with a crank 33, or other suitable means, whereby the valve member 4 may be manually rotated, if required or desired.

By reference to Fig. 3, it will be seen that the ratchet mechanism, whereby rotary motion is imparted to the feed valve member 4, is confined within a chamber enclosed by the walls of the casing 2, the end cap 29 and the web or septum 16 and this is done so that it may be supplied with a bath of oil. Such oil may be introduced into this chamber through a plugged opening 34 and drained therefrom through a similar opening 35. If desired, however, the web or septum 16 may be provided with openings (not shown) through which a part of the main body of lubricant carried in the device may enter the chamber. However, by using a separate bath of oil for the ratchet mechanism, water, which might otherwise enter the chamber when the main body of lubricant was depleted, as would be the case were the web perforated as mentioned, will be avoided.

Referring now particularly to Figs. 3 and 4, it will be seen that the bearing block 7 is provided with cored, or otherwise formed, passages 36 and 37 in line with the rows or sets of recesses 5 and 6, respectively, in the valve member 4. These passages are provided with bends terminating in ports 38 and 39 so located and of such size as to permit register with them successively of the recesses or depressions 5 and 6 respectively, in the valve member 4. Lateral branches 40 and 41 of the passages 36 and 37 communicate with the ports 38 and 39 of these respective passages, and are provided with nipples 42 and 43 to which lubricant delivery pipes may be attached.

The passages 36 and 37 are provided with a supply of fluid under pressure, preferably steam, through fittings 44 and 45, respectively, which are in open communication with a manifold 46 provided with a valve 47 and pipe 48 leading to the source of pressure fluid.

To one side of the axial center of the housing 2, and thus clearing the bearing sleeve 15, is a water pipe 49 which terminates adjacent to the bottom of the reservoir 1 within a cup-shaped water-seal member or trap 50 threaded into the bottom of the reservoir. This water pipe is connected at its upper end with a fitting 51 in communication with manifold 46, whereby steam pressure and water of condensation are conducted to the bottom of the reservoir 1 in the manner customary in hydrostatic lubricators.

Lubricant is introduced into the reservoir by means of a filler opening closed by a plug 52, Fig. 2, and sediment, water of condensation and oil, if required, may be drained from the reservoir by means of a cock 53, or by removal of the water seal member or trap 50.

In order that the lubricant may be maintained at the proper fluid consistency at low temperatures, we provide a heating unit 54, Figs. 2 and 3, in appropriate position in the reservoir, through which a heating medium, such as steam, may be circulated. Obviously an electric or other type heating unit may be substituted for that shown, if desired.

Referring now to Fig. 6, it will be seen that our device is susceptible of addition of feeds and mechanical feeding devices, so that more than four feeds may be obtained from a single reservoir, by connecting additional feeding units 55 having all of the characteristics of the feeding mechanism forming a part of the main device. These units are connected end to end with the housing 2, by means of appropriate flanges 56 and screws 57, by removing the end cap 58 from the housing and the plug 59 from the manifold and replacing the plug and cap upon the complemental parts of the last unit added. Nipples 60 may be used for connecting the several sections of the manifold 46.

The valve members 4' of the several units 55 will be driven from the main valve member 4 by means of forked drive links 20' and pins 19' and 21' similar to and operating in the same manner as the drive link 20 and pins 19 and 21.

If more feeds are added by the addition of these mechanical feed units 55 than can reasonably be accommodated by the reservoir 1, a reservoir of greater capacity may be substituted therefor.

Inasmuch as the lubricator of our invention is designed primarily for use in connection with steam locomotives and as steam may therefore be economically and effectively used both as the agent for furnishing the pressure and water of condensation necessary to the hydrostatic function of the device, and for supplying fluid pressure for conveying the lubricant to points of delivery, we will describe the operation of our lubricator in connection with such use.

The lubricator is mounted upon a suitable rigid bracket in a position on the locomotive convenient to a reciprocating part, such as a valve rod or cross-head, and the lever arm 30 is suitably connected to such part by means of a link or connecting rod of appropriate form, the oscillatory stroke of the arm 30 being so adjusted as to provide the necessary and desired angular movement of the valve member 4 of the feeding device. Obviously, an independent motor or other device may be used to operate the shaft 14, if desired.

The pipe 48 is connected with some appropriate steam supply which is always under steam pressure when the locomotive is in service (that is, out of the round-house) and the valve 47 which controls the admission of steam to the manifold is closed.

The pipes $v$ which communicate with the passage 37 through nipples 42 and 43 (Fig. 4) are connected with the valve chests on opposite sides of the locomotive, and the pipes $c$ which communicate with the passage 36 through similar nipples are connected with the engine cylinders on opposite sides of the locomotive. It will thus be seen that the set of recesses or depressions 6 of the valve member 4 feed lubricant in limited quantities to the engine valves, and the set of recesses or depressions 5 similarly feed lubricant to the engine cylinders.

Obviously, the relative quantity of oil fed to the valves and cylinders may be varied by varying the number or size (either or both) of the recesses or depressions 6 and 5, and if more than four feeds are required, additional units, as described in connection with Fig. 6, may be added.

Under normal operating conditions there is always sufficient water in the reservoir to fill the cup of the water seal trap 50, and thus when the reservoir is filled with lubricant through the opening closed by plug 52, the lubricant cannot rise in the water pipe 49.

When the reservoir 1 and the right-hand portion of the housing 2 are filled with lubricant (an appropriate fluid lubricant being used) and the plug 52 replaced and valve 47 opened, the lubricator is in operating condition.

Water of condensation entering the reservoir 1 through pipe 49, will automatically raise the lubricant in the reservoir and housing, by displacement, and cause it to enter the space between the bearing blocks 7 and 8 (Fig. 4) and the crown relief 13, and the steam pressure behind the body of water will force the lubricant to the valve member 4. Thus, when the valve member 4 is intermittently rotated, the recesses 5 and 6 will pick up or be filled with lubricant at two effective points during each complete rotation of valve member 4.

Referring to Fig. 4, it will be seen that as each of the recesses 6 is filled with lubricant at the opening between the bearing blocks (considering the valve member 4 as rotating contra-clockwise) it will present this oil at the port 39, where steam entering passage 37 through fitting 45 will pick up the lubricant cleanly from the recess and convey it through branch 41, nipple 43 and pipe $v$ and deliver it to the valve chest on the left-hand side of the locomotive. As a recess 6 is filled with lubricant from the crown relief 13 and presents this lubricant at port 38 the lubricant will be similarly picked up, conveyed and delivered to the valve chest on the right-hand side of the locomotive. The set of recesses or depressions 5 operating in a similar manner will deliver limited quantities of lubricant through the pipes $c$ to the left and right-hand engine cylinders.

In order that steam pressure may be held back in the pipes $v$ and $c$, we provide these pipes at their points of delivery with automatic check valves preferably of the type disclosed in the patent of Frank W. Edwards, for lubricator valves for steam chests, No. 981,544, dated January 10, 1911.

It will be apparent, due to the fact that the valve member 4 is rotated preferably through the medium of an operating part of the locomotive engine, that lubricant feed will take place only when the locomotive is in motion, but, due to the fact that the steam valve 47 is open during the entire time that the locomotive is in service, the lubricator will be in feeding condition whenever the valve member 4 is rotated.

By reference to Fig. 4, it will be seen that, due to the spacing of the recesses around the valve member 4 and the arrangement of the ports 38 and 39, it is impossible for the valve member ever to assume such a position that the passage 37 or 36 will be in direct communication with the body of lubricant.

As hereinbefore indicated, the strength of the spring 9 will be such as to hold the valve member 4 against its seat in the bearing block 7 so firmly as to preclude the possibility of the valve member backing away from same under the influence of steam pressure in the passages 36 and 37 and thus becoming inoperative. Any wabble or lateral or jumping movement of the valve member is prevented by the relatively full bearing upon it of the combined bearing surfaces of the blocks 7 and 8.

Undue axial movement of the valve member 4 is controlled by the predetermined length of the bearing sleeve 15 and the end cap 58 (as shown in Fig. 3).

In Fig. 6 undue axial movement of valve members 4 and 4' is prevented by the bearing sleeve 15, pin 19', link 20', pin 21' and cap 58.

In a construction of this type, it is very necessary to have some tolerance so as to permit the free movement of parts. It is also very necessary that the tolerance be kept to the minimum. This is evident because depressions 5 and 6 in valve members 4 and 4' must be kept in line with passages 36 and 37, so as to ensure the proper functioning of the device.

We are aware that it is not new to feed lubricant in limited quantities by means of a rotating valve member provided upon its periphery with a series of lubricant receiving depressions, but we are not aware of any such prior device combined with means for feeding the lubricant to the valve by hydrostatic pressure.

In lubricators known to us, employing a mechanical distributor and steam under pressure for conveying the lubricant from the point of distribution to the point of delivery, there is always some condensation of steam, and the water resulting therefrom remains in contact with the distributor with the result that after a certain time the distributor instead of feeding lubricant feeds water. The very grave fault in this is obvious.

Such a fault of operation cannot occur in lubricators embodying the principles of our invention. Any water of condensation forming around the mechanical feed mechanism of our device is promptly carried by the valve member 4 into the body of lubricant in the lubricator, through which it gravitates to the bottom of the reservoir 1 to there join the body of water of condensation supplied through water pipe 49.

Thus, where in other lubricators the pressure of water of condensation is detrimental if not really fatal to their proper functioning, in ours it is not only automatically removed from the zone of danger to effective operation, but, in supplementing the body of water of condensation necessarily, present, adds to the effectiveness of the hydrostatic feed.

Furthermore, should a leak occur in the feeding means whereby steam could escape into the oil surrounding same, this steam would condense and the water thus formed would gravitate to the body of water in the reservoir.

As hereinbefore stated, the quantity of lubricant fed by the member 4 may be varied by varying the size and number (either or both) of the recesses or depressions 5 and 6. In addition, the relative quantities fed by the two sets of depressions to the cylinders and valves, respectively, of the engine may be determined by the number or size or both of the depressions or recesses of the respective sets of same.

It will thus be seen that we provide by our invention a lubricator which combines with the definite limited quantity feed of a mechanical feeding device the positive, automatic, substantially uniform pressure principle of a hydrostatic lubricator.

Moreover, we have so combined and arranged the various parts of the lubricator in which these principles are embodied, as to provide an apparatus of relatively small, compact form, well suited for installation in confined space.

What we claim is:—

1. In a lubricator, a rotary valve member adapted to feed lubricant in limited quantities, a bearing for said member including a pair of spaced bearing blocks, one of said blocks provided with a crown relief and a pair of feed ports, and means for supplying lubricant to the zone of operation of said valve member and into the space between said blocks and into said crown relief, said valve member during rotation being thereby charged with lubricant at said space and crown relief respectively and discharging at said ports respectively.

2. In a lubricator, a mechanical lubricant-feeding device comprising a cylindrical valve member having a plurality of circumferentially alined lubricant-receiving recesses, a bearing for said member provided with a plurality of ports arranged radially of said valve member and with which said recesses may successively register, means for imparting rotary feeding movement to said valve member, and means for supplying lubricant to the zone of operation of said valve member whereby upon feeding movement of said valve member said recesses will be successively filled with lubricant and will discharge said lubricant at said ports upon successive register therewith.

3. In a lubricator, a lubricant reservoir, a cylindrical valve member in communication with said reservoir and provided with a plurality of circumferentially alined recesses adapted to feed lubricant in limited quantities, means for imparting rotary movement to said valve member, a bearing for such valve member providing a plurality of openings in communication with said reservoir and at which said recesses may be successively supplied with lubricant, a plurality of ports adapted for radial alinement with said recesses and through which the lubricant contained in said recesses may be successively discharged to a similar plurality of feeds, and means for hydrostatically displacing the lubricant into the zone of operation of said valve member and thus through said openings into said recesses during rotation of said valve member.

4. In a lubricator, a mechanical lubricant feeding device comprising a cylindrical valve member having a plurality of circumferentially alined lubricant receiving recesses, a bearing for said member provided with a plurality of ports arranged radially of said valve member and with which said recesses may register, means for imparting rotary feeding movement to said valve member, means for supplying lubricant to the zone of operation of said valve member, whereby upon feeding movement of said valve member said recesses will be successively filled with lubricant and will discharge said lubricant at said ports upon successive register therewith, and pressure fluid means for clearing said recesses of lubricant and conveying said lubricant from said ports to points of application.

5. In a lubricator, a housing, a mechanical lubricant feeding device comprising a cylindrical valve member having a plurality of lubricant receiving recesses, a fixed bearing block and a movable bearing block arranged within said housing and forming a bearing for said member and substantially surrounding same, said fixed bearing block provided with lubricant discharge ports with which said recesses are adapted to register, means for supplying lubricant to the zone of operation of said valve member, and means including a spring for resiliently supporting said movable bearing block and thereby forcing said valve member to a seat against said fixed bearing block, said spring being carried by a sleeve arranged in said housing and engaging said movable bearing block to prevent movement thereof axially of said valve member.

6. In a lubricator, a mechanical lubricant feeding device comprising a rotary cylindrical valve member having a plurality of lubricant receiving recesses, a fixed bearing block and a movable bearing block embracing said member but spaced from each other, said fixed bearing block provided with a pair of ports with which said recesses are adapted to register and a crown relief, means for supplying lubricant to the zone of action of said valve member and to the space between said bearing blocks and to said crown relief, whereby said recesses may be filled with lubricant successively at said space and crown relief and may discharge said lubricant successively at said ports during each rotation of said valve member, and resilient means for supporting said movable bearing block and for thereby forcing said valve member to a seat against said fixed bearing block.

7. In a lubricator, a lubricant reservoir, a housing carried thereby exteriorly thereof and provided with a mechanical feeding device, means for imparting feeding movement to said feeding device, a feed unit provided with means whereby it may be assembled upon said housing to form a continuation thereof exteriorly of said reservoir and containing a feeding device similar to that of the housing, means for imparting feeding movement to the device of said unit from the device of said housing, and means for supplying lubricant from said reservoir to the zones of operation of said feeding devices, whereby a plurality of mechanical feeding devices may be simultaneously driven from the same source and supplied with lubricant from a single reservoir.

In testimony whereof we have hereunto set our hands this 26th day of May, A. D. 1928.

FRANK WILLIAM EDWARDS.
ARTHUR C. BECKWITH.